(12) United States Patent
Diab et al.

(10) Patent No.: US 7,607,033 B2
(45) Date of Patent: *Oct. 20, 2009

(54) METHODS AND APPARATUS FOR PROVISIONING PHANTOM POWER TO REMOTE DEVICES

(75) Inventors: Wael William Diab, San Francisco, CA (US); Frederick R. Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/015,590

(22) Filed: Jan. 17, 2008

(65) Prior Publication Data
US 2008/0133946 A1 Jun. 5, 2008

Related U.S. Application Data

(63) Continuation of application No. 10/850,205, filed on May 20, 2004, now Pat. No. 7,353,407.

(51) Int. Cl.
G06F 1/00 (2006.01)
G06F 11/30 (2006.01)
(52) U.S. Cl. .................. 713/300; 713/330; 713/340
(58) Field of Classification Search ................ 713/300
See application file for complete search history.

(56) References Cited
U.S. PATENT DOCUMENTS 3,922,659 A 11/1975 Dighe
4,370,562 A 1/1983 Palazzetti et al.
5,148,144 A 9/1992 Sutterlin et al.
5,550,917 A 8/1996 Tallec
5,625,621 A 4/1997 Christensen et al.
5,642,052 A 6/1997 Earle
5,670,937 A 9/1997 Right et al.

(Continued)

FOREIGN PATENT DOCUMENTS

EP 0777357 A2 4/1997

(Continued)

OTHER PUBLICATIONS

Foskett, S., "Stephen Foskett's Power Over Ethernet (PoE) Calculator," Version 1.01, Jun. 21, 2003, pp. 2.

(Continued)

Primary Examiner—Suresh K Suryawanshi
(74) Attorney, Agent, or Firm—BainwoodHuang

(57) ABSTRACT

An apparatus provisions power from a power budget to remote devices configured to obtain phantom power. The apparatus includes, among other things, a controller which is configured to identify a power demand for a remote device (e.g., a power demand based on an actual cable loss), and generate a comparison between the power demand for the remote device and the power budget of the apparatus. The controller is further configured to allocate power from the power budget provided by the power supply to the remote device when the comparison indicates that the power budget supports the power demand for the remote device, and reject allocation of power from the power budget to the remote device when the comparison indicates that the power budget does not support the power demand for the remote device.

24 Claims, 4 Drawing Sheets

U.S. PATENT DOCUMENTS

| | | | |
|---|---|---|---|
| 5,680,397 A | 10/1997 | Christensen et al. |
| 5,784,237 A | 7/1998 | Velez |
| 5,842,027 A | 11/1998 | Oprescu et al. |
| 5,912,963 A | 6/1999 | Begeja et al. |
| 5,936,442 A | 8/1999 | Liu et al. |
| 5,991,885 A | 11/1999 | Chang et al. |
| 5,994,998 A | 11/1999 | Fisher et al. |
| 6,016,519 A | 1/2000 | Chida et al. |
| 6,040,969 A | 3/2000 | Winch et al. |
| 6,115,468 A | 9/2000 | De Nicolo |
| 6,140,911 A | 10/2000 | Fisher et al. |
| 6,175,556 B1 | 1/2001 | Allen, Jr. et al. |
| 6,233,235 B1 | 5/2001 | Burke et al. |
| 6,246,748 B1 | 6/2001 | Yano |
| 6,317,839 B1 | 11/2001 | Wells |
| 6,345,047 B1 | 2/2002 | Regnier |
| 6,348,874 B1 | 2/2002 | Cole et al. |
| 6,357,011 B2 | 3/2002 | Gilbert |
| 6,366,143 B1 | 4/2002 | Liu et al. |
| 6,393,050 B1 | 5/2002 | Liu |
| 6,473,608 B1 * | 10/2002 | Lehr et al. ............ 455/402 |
| 6,496,103 B1 | 12/2002 | Weiss et al. |
| 6,526,516 B1 | 2/2003 | Ishikawa et al. |
| 6,535,983 B1 | 3/2003 | McCormack et al. |
| 6,546,494 B1 | 4/2003 | Jackson et al. |
| 6,701,443 B1 | 3/2004 | Bell |
| 6,874,093 B2 | 3/2005 | Bell |
| 6,985,713 B2 | 1/2006 | Lehr et al. |
| 7,353,407 B2 | 4/2008 | Diab et al. |
| 2003/0005339 A1 | 1/2003 | Cohen et al. |
| 2003/0135766 A1 | 7/2003 | Zyskowski et al. |
| 2004/0025066 A1 | 2/2004 | Jackson et al. |
| 2004/0230846 A1 | 11/2004 | Mancey et al. |
| 2005/0102544 A1 | 5/2005 | Brewer et al. |

FOREIGN PATENT DOCUMENTS

| | | |
|---|---|---|
| GB | 2034055 A | 5/1980 |
| JP | 2000214964 A | 8/2000 |
| WO | 00/41496 A2 | 7/2000 |

OTHER PUBLICATIONS

Joan, J., "DC power from Ethernet," Jan. 29, 2002, p. 1.
Mendelson, G., et al., "Installing and IP Telephony Network Using Power over LAN," Nov. 3, 2003, 10 pages.
International Search Report, for PCT/US2005/013365, mailed on Sep. 6, 2005. Total number of pages: 2.
Tilden, Mark D., "Measuring controlled-impedance boards with TDR", Printed Circuit Fabrication, Feb. 1992.

\* cited by examiner

METHODS AND APPARATUS FOR PROVISIONING PHANTOM POWER TO REMOTE DEVICES

CROSS REFERENCE TO RELATED APPLICATIONS

This Patent Application is a Continuation of U.S. patent application Ser. No. 10/850,205 filed on May 20, 2004 entitled, "Methods and Apparatus for Provisioning Phantom Power to Remote Devices", the contents and teachings of which are hereby incorporated by reference in their entirety.

BACKGROUND

A typical phantom power communications system includes power-sourcing communications equipment and a set of remotely powered network devices that connect to the power sourcing communications equipment though a set of network cables. The power sourcing communications equipment includes a power supply and transmit/receive circuitry. During operation, the power supply provides power to the remotely powered network devices through the network cables, and the transmit/receive circuitry concurrently exchanges data with the remotely powered network devices through the network cables. Accordingly, the users of the remotely-powered network devices are not burdened with having to separately connect their devices to power sources (e.g., wall outlets).

There are a variety of conventional approaches that an equipment manufacturer uses when establishing design specifications for the power-sourcing communications equipment. One approach, which is hereinafter referred to as the "over provisioning approach", involves the equipment manufacture designing the power-sourcing communications equipment for a worst case scenario in which the power sourcing communications equipment connects to a maximum number of remotely powered network devices through network cables at their maximum specified lengths (e.g., 100 meters in accordance with the IEEE 802.3af standard). Under this approach, the equipment manufacturer provisions particular characteristics of the power sourcing communications equipment for a maximum power draw (e.g., maximum power supplied to each remote device and maximum power loss over each network cable due to the network cables being at their maximum lengths). To this end, the manufacturer makes certain aspects of the equipment large enough to adequately fulfill the maximum power draw, e.g., the manufacturer makes sure the power supply is large enough, makes sure that the there are enough circuit board power planes or that the circuit board power planes and power converts are robust enough to carry worst case current, makes sure that the fan assembly is strong enough to provide adequate cooling, etc.). In some situations, the worst case scenario for certain high-end systems may require the manufacturer to provision the power sourcing communications equipment for larger amperage circuitry (e.g., to upgrade power cabling from 15 Amp cords and plugs to 20 Amp cords and plugs, etc.).

Another approach, which is hereinafter referred to as the "statistical methods" approach, involves the equipment manufacture designing the power-sourcing communications equipment based on probable uses of the equipment in the field. For example, the manufacturer may offer two models of power-sourcing communications equipment, namely, a lower end model which is designed for lower power demand situations, and a higher end model which is designed for higher power demand situation, and then rely on the customer to select the best-suited model for a particular installation location.

There are also industry standards which attempt to provide guidelines for manufacturing certain types of power-sourcing communications equipment. For example, the IEEE 802.3af standard, which is also called the "Power over Ethernet" standard, defines ways to build Ethernet power-sourcing equipment and powered terminals. In particular, the IEEE 802.3af standard identifies ways to deliver certain electrical features (e.g., 48 volts) of AC power over unshielded twisted pair wiring (e.g., Category 3, 5, 5e or 6 network cables, patch cables, patch-panels, outlets and connecting hardware) to a variety of Ethernet devices or terminals such as IP phones, wireless LAN access points, laptop computers and Web cameras.

In the context of the IEEE 802.3 Ethernet Standard where the power sourcing communications equipment is called the PSE (Power Sourcing Equipment) and the remote device is called the PD (Powered Device), some PSEs include Time Domain Reflectometry circuitry which determines the integrity of the cables, i.e., the data channels. The PSEs then communicate with PDs through the cables with improved cable utilization based on the qualities of the cables (e.g., older cables, Category 5e cables, etc.).

SUMMARY

Unfortunately, there are deficiencies to the above-described conventional approaches to designing power-sourcing communications equipment for delivering phantom power to remotely powered devices. For example, in the above-described conventional over provisioning approach, the equipment manufacturer essentially over designs or over engineers the power sourcing communications equipment beyond what is necessary in order to satisfy an extremely rare (i.e., low probability) worst-case situation. Such over provisioning increases the cost of the equipment, places an unnecessarily low limit to the number of ports that can be remotely powered, and wastes resources (e.g., oversized power supplies, circuit boards, converters, cables, fans assemblies, etc.).

Additionally, in the above-described conventional statistical methods approach, the equipment manufacturer depends on assumptions regarding expected power consumption and essentially takes a gamble that the equipment will work properly in each installation location, on a location by location basis. Such an approach is unreliable and often does not comply with industry standards. For example, the IEEE 802.3af standard prohibits the use of the statistical methods approach.

In contrast to the above-described conventional approaches to designing power sourcing communications equipment, embodiments of the invention are directed to techniques for provisioning power from a power budget of a power-sourcing apparatus which involves comparing a power demand for a remote device (e.g., using an actual cable loss) and allocating power from the power budget when the comparison indicates that the power budget supports the power demand. Such techniques enable smart in-line power provisioning for phantom power applications as well as enable safeguarding against inadvertently attempting to provide more power than what is available in the power budget and thus is capable of avoiding causing damage the power sourcing equipment.

One embodiment is directed to an apparatus for provisioning power from a power budget to a set of remote devices configured to obtain phantom power from the apparatus. The apparatus includes a set of ports configured to connect to the set of remote devices through a set of cables, a power supply configured to provide power within the power budget, and a controller coupled to the set of ports and to the power supply. The controller is configured to identify, through a port of the set of ports, a power demand for a remote device, and generate a comparison between the power demand for the remote device and the power budget of the apparatus. The controller is further configured to allocate power from the power budget provided by the power supply to the remote device through the port of the set of ports when the comparison indicates that the power budget supports the power demand for the remote device, and reject allocation of power from the power budget to the remote device when the comparison indicates that the power budget does not support the power demand for the remote device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the invention are directed to techniques for provisioning power from a power budget of a power-sourcing apparatus which involves comparing a power demand for a remote device and allocating power from the power budget when the comparison indicates that the power budget supports the power demand. Such techniques enable smart in-line power provisioning for phantom power applications as well as enable safeguarding against inadvertently attempting to provide more power than what is available in the power budget and thus avoiding damaging the power-sourcing equipment.

Figure 1:
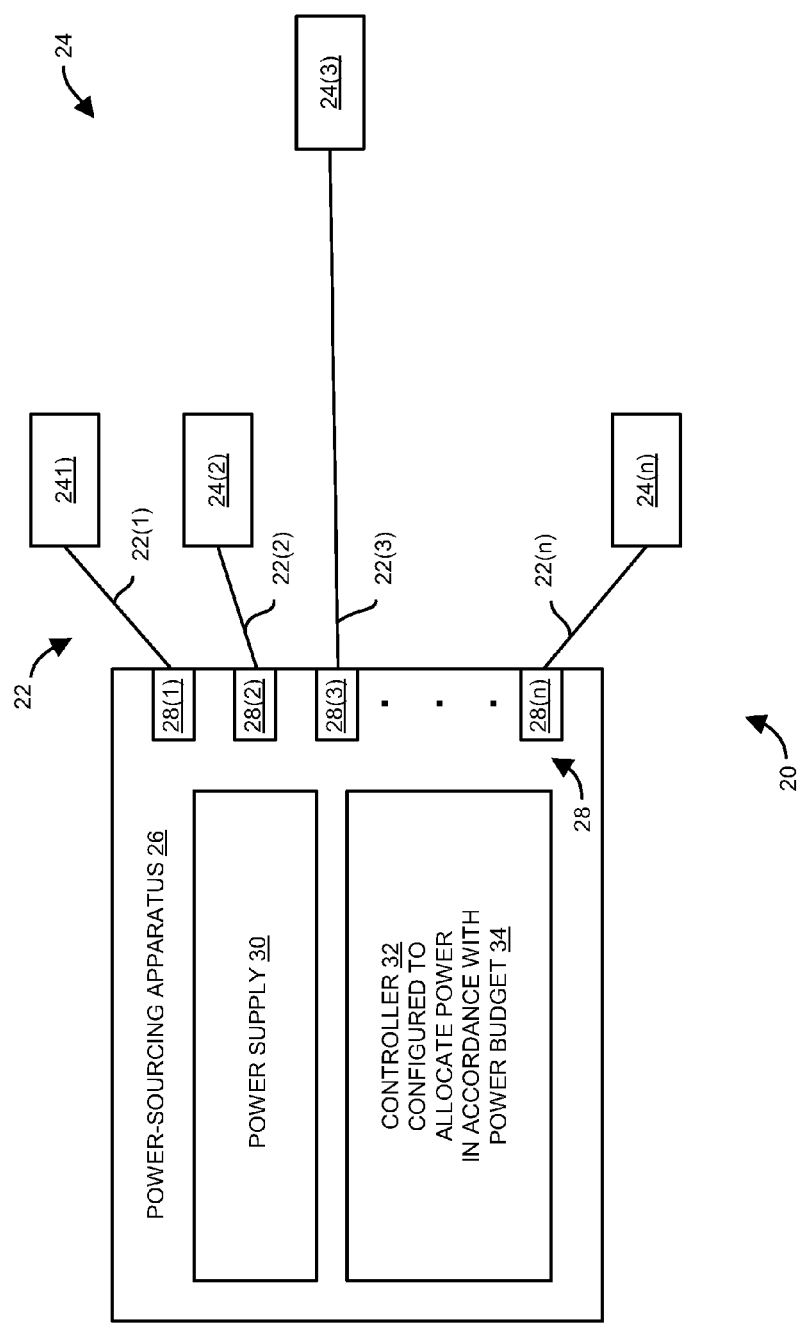
FIG. 1 is a block diagram of a communication system which is suitable for use by the invention.

FIG. 1 shows a communications system 20 which is suitable for use by the invention. The communications system 20 includes a set of cables 22(1), ..., 22(n) (collectively, cables 22), a set of remote devices 24(1), ..., 24(n) (collectively, remote devices 24), and a power-sourcing apparatus 26. The power-sourcing apparatus 26 includes a set of ports 28(1), ..., 28(n) (collectively, ports 28), a power supply 30, and a controller 32.

The controller 32 is configured to allocate power from the ports 28 in accordance with a power budget 32. Such power allocation delivers phantom power to the remote devices 24 thus alleviating the need for the remote devices 24 to make a separate connection to a power source. Additionally, some of the allocated power is consumed by the cables 22 due to cable resistance. Further details of the invention will now be provided with reference to FIG. 2.

Figure 2:
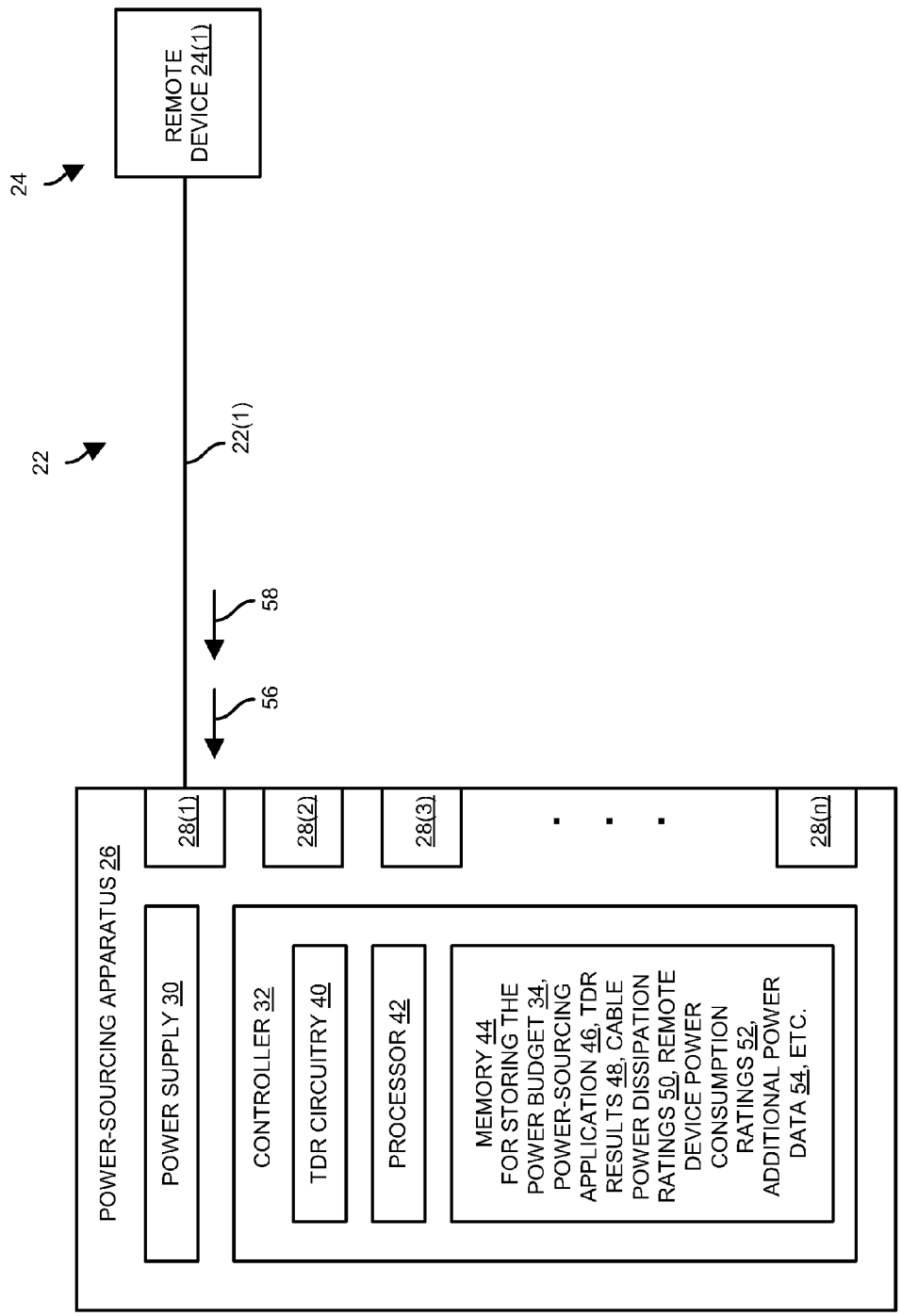
FIG. 2 is a block diagram of particular details of the communication system of FIG. 1 in accordance with a first embodiment.

FIG. 2 shows a block diagram of the power-sourcing apparatus 26 connected to the remote device 24(1) in accordance with a first embodiment of the invention. The other cables and other remote devices 24 are omitted from FIG. 2 for simplicity.

As shown in FIG. 2, the controller 32 includes time domain reflectometry (TDR) circuitry 40, a processor 42 and memory 44. The TDR circuitry 40 is configured to (i) measure distances from the power-sourcing apparatus 26 to the remote devices 24 through the ports 28, and (ii) identify the types of cables 22 (e.g., Category 3, Category 5, etc.) connecting the power-sourcing apparatus 26 to those remote devices 24. The memory 44 stores the power budget 34 (e.g., a percentage of the actual capacity of the power supply 30 such as 80%, 85%, 100%, etc.), a power-sourcing application 46, TDR results 48, power dissipation ratings for various cables 50 (e.g., a first power dissipation value per linear meter for Category 3 cabling, a second power dissipation value per linear meter for Category 5 cabling, and so on), power consumption ratings for various types of remote devices 52 (e.g., a first power consumption value for a VoIP phone, a second power consumption value for a laptop computer, and so on) and additional power data 54.

It should be understood that the power dissipation ratings 50 for various types of cables 22 is easily determinable. For example, suppose that a particular remote device 24 consumes 12.95 Watts of power during operation. Further suppose that a manufacturer of the power-sourcing apparatus 26 measures that the apparatus 26 provides 15.40 Watts of power through a port 28 that connects to the remote device through a 100 meter length of cable 22 in order to provide the 12.95 Watts of power to the remote device 28. Accordingly, the amount of power dissipated through the 100 meter length of cable 22 is capable of being calculated as follows:

| 15.40 W | -PSE Max Output |
| 12.95 W | -PD Max Input |
| 2.45 W | -Max Cable Dissipation |

As a result, the manufacturer determines that approximate 24.5 mW of power is lost through each meter of the cable 22, i.e., roughly 16% of the power provisioned by the apparatus 26.

It should be further understood that some conventional power-sourcing devices include crude detection circuitry in the PHYs to determine the type of cables or quality of cables connecting to their ports. This crude circuitry can be enhanced or upgraded to provide the TDR circuitry 40 which employs standard TDR techniques to not only determine the type cables 22 connecting to the ports 28, but also to determine the lengths of those cables 22. Once the lengths of the those cables 22 are identified, it is a simple matter to determine the power dissipation through each cable 22.

For example, as shown in FIG. 2, the TDR circuitry 40 determines (i) a type 56 of the cable 22(1) from additional data 56 stored in the memory 44 and (ii) a distance 58 of the cable 22(1). The controller 32 then identifies the incremental power dissipation per unit length for the type 56 of cable 22(1) from the available cable power dissipation ratings 50 stored in the memory 44. The controller 32 then calculates the power dissipation through the cable 22(1) as follows.

$$\begin{array}{c}\text{Power Dissipation} \\ \text{through the} \\ \text{Cable(in Watts)}\end{array} = \begin{array}{c}\text{Incremental} \\ \text{Power Dissipation} \\ \text{(in Watts per meter)}\end{array} \times \begin{array}{c}\text{Cable} \\ \text{Distance} \\ \text{(in meters)}\end{array} \quad (1)$$

Accordingly, if the TDR circuitry 40 determines that (i) the type 56 of the cable 22(1) is a certain type (e.g., CAT-3, etc.) which consumes 24.5 mW per meter, and (ii) the measured distance 58 of the cable 22(1) is 50 meters, the controller 32 then determines that the power dissipation through the cable 22(1) is 1.225 W (i.e., 24.5 mW/meter times 50 meters).

An alternative and more precise technique for determining the power dissipation through a cable 22 is for the power-sourcing apparatus 26 to base the power dissipation on current through the cable 22. For example, suppose that resistance per meter of the cable 22(1) of FIG. 2 is known. The total resistance $R_{cable}$ of the entire cable 22(1) is simply the total distance measured by the TDR circuitry 40 multiplied by the resistance per meter. That is:

$$\begin{array}{c}R_{cable} \\ \text{(in Ohms)}\end{array} = \begin{array}{c}\text{Cable} \\ \text{Distance} \\ \text{(in meters)}\end{array} * \begin{array}{c}\text{Incremental} \\ \text{Resistance Per Meter} \\ \text{(in Ohms per meter)}\end{array} \quad (2)$$

Additionally, the maximum power consumption $P_{max}$ of the remote device 24 is easily discoverable by communicating with the remote device 24. Once the power-sourcing apparatus 26 knows the maximum power consumption $P_{max}$ of the remote device 24, the power-sourcing apparatus 26 easily calculates the maximum current $I_{max}$ through the cable 22(1) by dividing the maximum power consumed by the remote device 24 by the voltage provided by the power-sourcing apparatus 26 to the cable 22(1) when providing phantom power. That is:

$$\begin{array}{c}I_{max} \\ \text{(in Amps)}\end{array} = \begin{array}{c}P_{max} \\ \text{(in Watts)}\end{array} \Big/ \begin{array}{c}\text{Voltage} \\ \text{Applied to the Cable} \\ \text{(in Volts)}\end{array} \quad (3)$$

As a result, the maximum power dissipated through the cable 22(1) $P_{cable}$ equals the maximum current $I_{max}$ through the cable 22(1) squared multiplied by the total resistance $R_{cable}$ of the cable 22(1). That is:

$$\begin{array}{c}P_{cable} \\ \text{(in Watts)}\end{array} = \begin{array}{c}I_{max}^2 \\ \text{(in Amps}^2\text{)}\end{array} * \begin{array}{c}R_{cable} \\ \text{(in Ohms)}\end{array} \quad (4)$$

Once the power-sourcing apparatus 26 knows the amount of power dissipation through a cable 22 connected to one of its ports 28, the power-sourcing apparatus 26 is capable of smartly provisioning power from the power budget 34. That is, the controller 32 adds the required power dissipation through the cable 22 and the power demand (i.e., the power consumption rating) of the remote device 28 that connects to the apparatus 26 through that cable 22, the controller 32 is capable of determining whether the power budget 34 supports the power demand through the port 28. In particular, if the power budget 34 supports the power demand, the controller 32 allocates power from the power budget 34 to the remote device 24 through the port 28. However, if the power budget 34 does not support the power demand, the controller 32 rejects allocation of power from the power budget 34 to the remote device 24 through the port 28.

In the earlier-described example, the power dissipation through the cable 22 what determined to be 1.225 Watts and the remote device power consumption rating is 12.95 Watts. Accordingly, the total power for operating the remote device 24 is 14.175 Watts. If there is at least this amount of power left in the power budget 34, the controller 32 allocates 14.175 Watts of power to the remote device 24 and reduces the power budget 34 by that amount. Such smart provisioning of power enables the use of lower-power equipment (e.g., smaller capacity power supplies and circuit boards which are capable of connecting to 15 Amp wall outlets rather than 20 Amp outlets) to lower costs but safeguards against over-consuming the resources of the power-sourcing apparatus 26 (e.g., avoids damaging the power supply 30 by drawing too much power, avoids "brown-out" operating situations due to surges in power demand, etc.).

It should be understood that the difference between the more-precise worst case power consumption determined by the power-sourcing apparatus 26 (e.g., 14.175 Watts) and the worst case power consumption typically assigned using a non-measured worst case cable length of 100 meters (see the earlier described PSE Max Output of 15.4 Watts) is significant. In the above-provided example, the difference is 1.225 Watts. If the power-sourcing apparatus 26 is configured to service 200 ports, there is a savings of 245 Watts DC. This number is convertible to AC by assuming an efficiency of 0.64 (i.e., conversion of AC to DC and DC to DC isolation each at 80%) which thus provides:

$$245 \text{ Watts DC}/0.64 \text{ Watts DC/Watts AC} = 383 \text{ Watts AC} \quad (5)$$

which is the cost of over-provisioning a convention PSE which is incapable of allocating power from a power budget based on actual cable distances. Such smart power provisioning offered by the various embodiments of the invention becomes even more valuable as the complexity and power requirements of remote devices 24 increase over time. Further details of the invention will now be provided with reference to FIG. 3.

Figure 3:
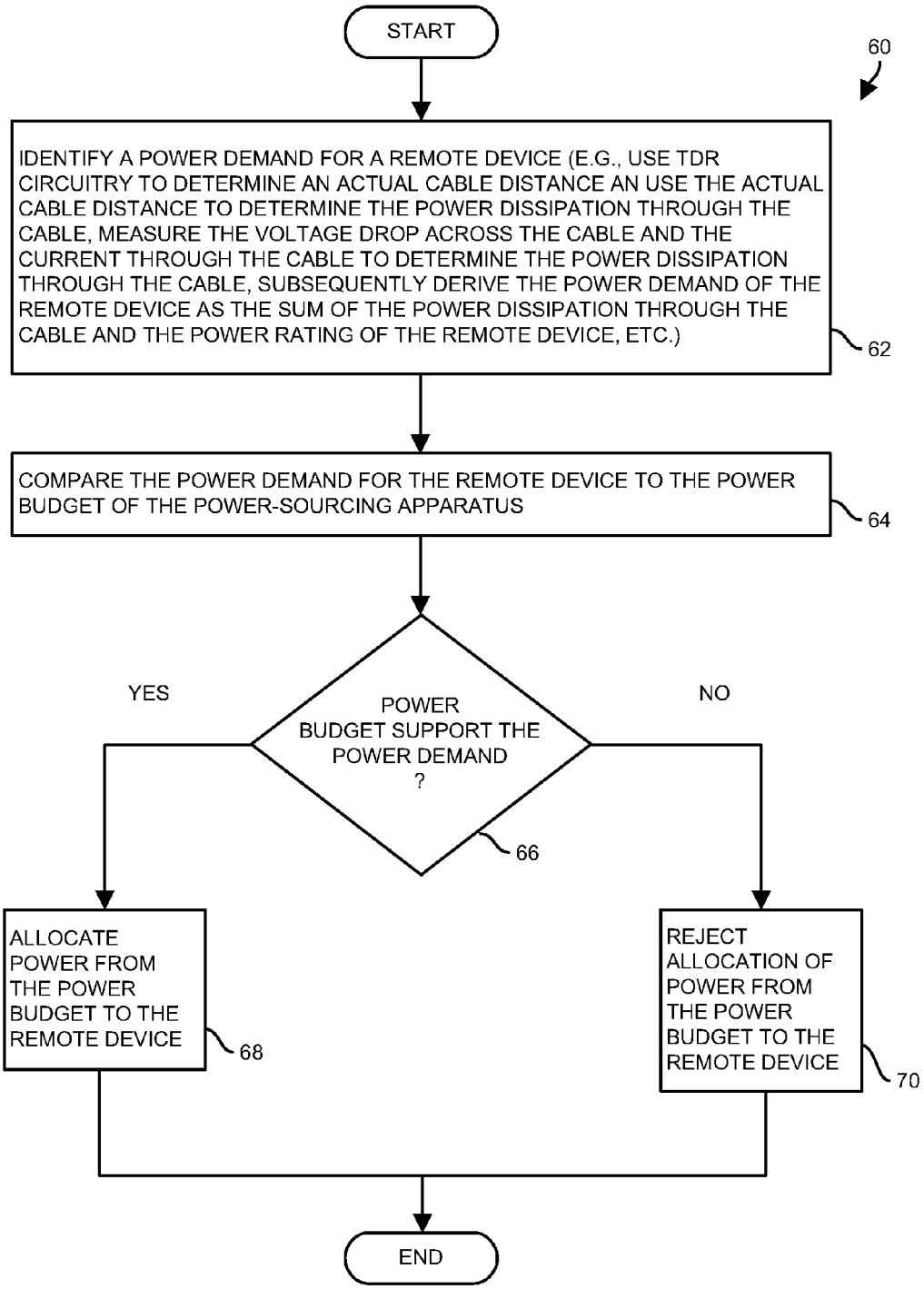
FIG. 3 is a flowchart of a procedure which is performed by a power-sourcing apparatus of the communications system of FIG. 1.

FIG. 3 shows a procedure 60 which is performed by the controller 32 of the power-sourcing apparatus 26 in response to detection of a remote device 24 connected to a port 28 through a cable 22. The controller 32 performs the procedure 60 each time the controller 32 detects a new remote device 24 connected to a port 28. For example, at startup of the power-sourcing apparatus 26, the controller 32 performs the procedure 60 for each port 28 starting with port 28(1), 28(2), and so on. As another example, the controller 32 performs the procedure dynamically in an incremental manner after startup, each time the apparatus 26 detects a new remote device 24 connecting to a port 28.

In step 62, the controller 32, under direction of the power-sourcing application 46, identifies a power demand for a remote device 28. In particular, the controller 32 directs the TDR circuitry 40 to send a signal through the cable 22 leading from the apparatus 26 to the remote device 24 to determine a cable distance 58 between the apparatus 26 and the remote device 24 (also see FIG. 2), and then calculates a cable dissipation power value $P_{cable}$ based on the cable distance 58 (also see Equations (2), (3) and (4) above). Next, the controller 32 provides, as the power demand for the remote device 24, a remote device power value or rating 52 for the remote device 24 and the calculated cable dissipation power value, i.e., the sum of these two values.

In step 64, the controller 32 generates a comparison between the power demand for the remote device 24 and the power budget 34 of the apparatus 26 and proceeds to step 66. If the power budget 34 supports this demand (e.g., if the power budget 34 is greater than the power demand), step 66 proceeds to step 68. Otherwise, if the power budget 34 does not support this demand (e.g., if the power budget 34 is not greater than the power demand), step 66 proceeds to step 70.

In step 68, the controller 32 allocates power from the power budget 34 to the remote device 24. In response to such phantom power delivery, the remote device 24 becomes operational.

On the other hand, in step 70, the controller 32 rejects allocation of power from the power budget 34. In this situation, the remote device 24 does not become operational under phantom power and drawbacks associated with attempting to provide power beyond the means of the apparatus 26 (e.g., damage, a brown-out condition, etc.) are avoided.

It should be understood that such smart power budgeting alleviates the need for manufacturers to over-provision their power-sourcing equipment thus saving costs of not having to provide larger than necessary equipment, i.e., larger power supplies, circuit boards, power cables, fan assemblies, etc. Rather, the manufacturers are now capable of properly provisioning their power-sourcing equipment without fear of damaging the equipment due to improperly configuring the equipment and with a relatively low cost per Watt metric. To this end, the power-sourcing apparatus 26 allocate power through a port 28 only if the power budget 34 supports such allocation. There is no worry of causing damage (e.g., there is no risk of burning out the power supply 30) or encountering brown-out conditions due to inadequate power provisioning. Further details of the invention will now be provided with reference to FIG. 4.

Figure 4:
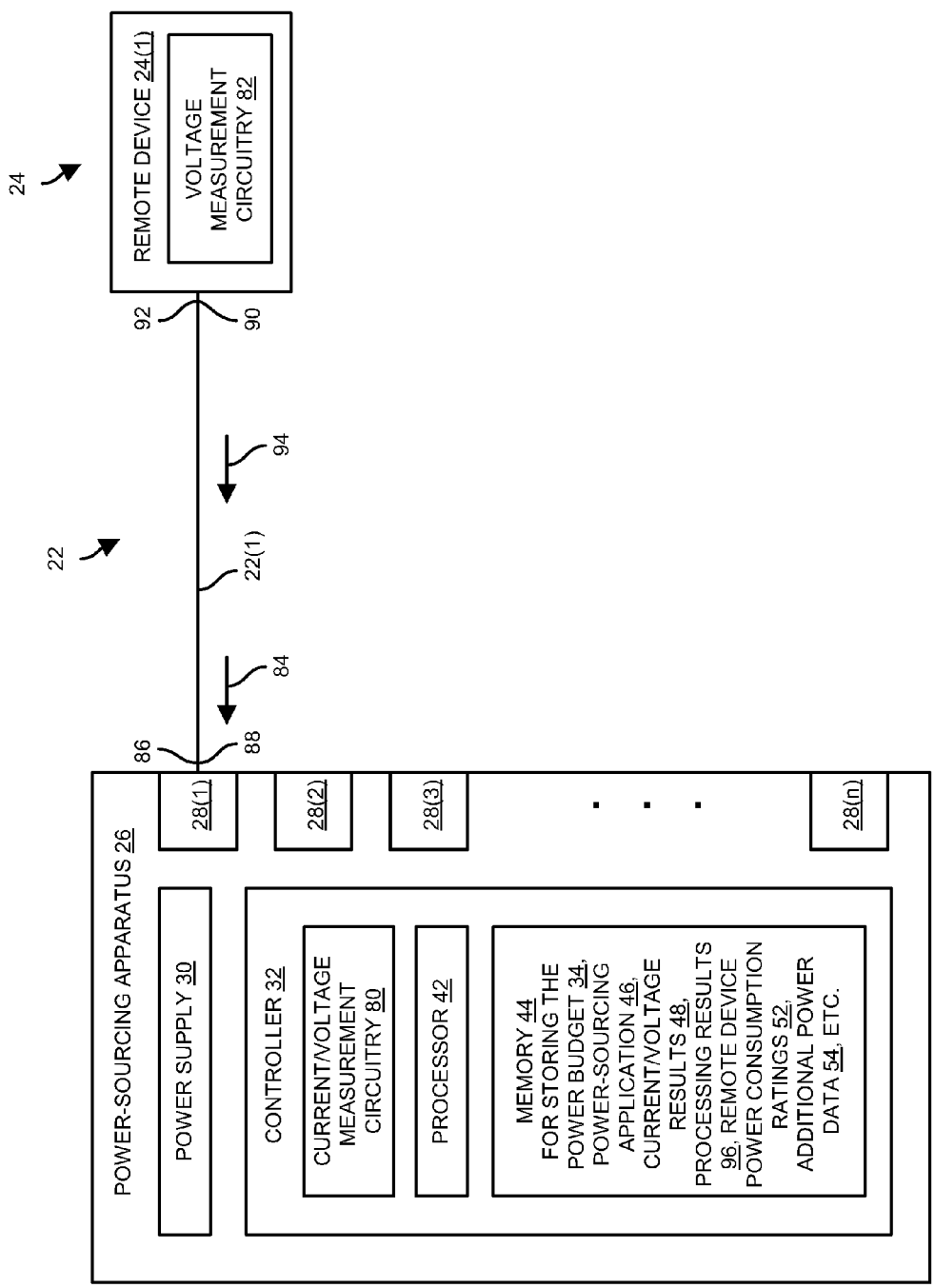
FIG. 4 is a block diagram of particular details of the communication system of FIG. 1 in accordance with a second embodiment.

FIG. 4 shows a block diagram of the power-sourcing apparatus 26 connected to the remote device 24(1) in accordance with a second embodiment of the invention. As shown in FIG. 4, the power-sourcing apparatus 26 is similar to that in FIG. 2 except that the power-sourcing apparatus 26 includes current/voltage measurement circuitry 80 rather than the TDR circuitry 40. Furthermore, the remote device 24 includes voltage measurement circuitry 82. Again, only one cable 22(1) and one remote device 24(1) are shown for simplicity.

During operation, the controller 32 of the power-sourcing apparatus 26 determines the total resistance $R_{cable}$ through the cable 22(1) and then the maximum power dissipation $P_{max}$ through the cable 22(1). In particular, the controller 32, under direction of the power-sourcing application 46, directs the current/voltage measurement circuitry 80 to precisely measure the current 84 passing through the cable 22 and a voltage 86 applied to one end 88 of the cable 22 (i.e., $V_{pse}$). Additionally, the voltage measurement circuitry 82 of the remote device 24, which operates at least initially in a preliminary or start-up low power state to draw minimal power from the cable 22(1), measures a voltage 90 at the other end 92 of the cable 22 (i.e., $V_{pd}$) and sends a message 94 to the controller 32 identifying the voltage 90 and the type of remote device 24 (e.g., VoIP phone, laptop, etc.). The controller 32 is then capable of calculating the difference between the voltages 86, 90 to determine the voltage drop along the cable 22, e.g., see the processing results 96 in the memory 44. That is:

$$\text{Voltage Drop Through Cable (in Volts)} = \frac{V_{pse}}{(\text{in Volts})} - \frac{V_{pd}}{(\text{in Volts})} \quad (6)$$

Once the controller 32 knows the voltage drop $V_{drop}$ through the cable 22(1), the controller 32 calculates the total cable resistance $R_{cable}$ based on the voltage drop $V_{drop}$ and the measured current 84, $I_{measured}$. That is, $$\frac{R_{cable}}{(\text{in Ohms})} = \frac{V_{drop}}{(\text{in Volts})} \bigg/ \frac{I_{measured}}{(\text{in Amps})} \quad (7)$$

Next, the controller 32 simply uses the techniques described above in connection with FIG. 2 (see Equations (3) and (4)) to determine the overall power demand through a particular port 28. In particular, the controller 32 knows the maximum power draw $P_{max}$ of the remote device 24(1) by discovery (e.g., using an IEEE method of discovery) applies equation (3) to determine the maximum current $I_{max}$ through the cable 22(1). Subsequently, the controller 32 applies equation (4) to determine the maximum power dissipated through the cable $P_{cable}$.

At this point, the controller 32 adds the required power dissipation $P_{cable}$ through the cable 22(1) and the power demand (i.e., the power consumption rating) of the remote device 24 $P_{max}$ that connects to the apparatus 26 through that cable 22 to derive the total power demand (also see step 62 in FIG. 3). Then, as mentioned above in connection with FIG. 2, the controller 32 is capable of determining whether the power budget 34 supports the total power demand through the port 28 (step 64 in FIG. 3). In particular, if the power budget 34 supports this power demand, the controller 32 allocates power from the power budget 34 to the remote device 24 through the port 28 (steps 66 and 68 in FIG. 3) and downwardly adjusts the power budget 34 to account for the this power allocation. The remote device 24 responds by transitioning from the preliminary state to a normal operating state in which the remote device 24 is now capable of operating under higher power. However, if the power budget 34 does not support this power demand, the controller 32 rejects allocation of power from the power budget 34 to the remote device 24 through the port 28 (steps 66 and 70 in FIG. 3).

It should be understood that the controller 32 is capable of re-performing the above-described procedure while the remote device 24 operates in a state other than a start up state. For example, the controller 32 is capable of re-performing the above-described procedure while the remote device 24 is under high power, i.e., when the remote device 24 is in a normal operating state. The result of the procedure while the remote device 24 operates under high power is the exact or actual power draw. Accordingly, the controller 32 is capable of obtaining both the worst case power draw and the actual power draw for the remote device 24 by performing the above-described procedure at different times of operation.

As general example, the controller 32 is capable of performing the above-described procedure while the remote device 24 is in a known power state or known operating point. The remote device 24 is capable of entering this known power state from a variety of situations (e.g., during start up, in response to a command from the power-sourcing apparatus 32, etc.). Once the remote device 24 is in the known power state, the controller 32 performs a procedure to determine the actual loss $R_{loss}$ through the cable 22 leading to the remote device 24. In particular, the controller 32 measures the voltage $V_{pse}$ at the near end 88 of the cable 22 and the current through the cable 22. Additionally, the controller 32 extrapolates the voltage $V_{pd}$ at the far 92 end of the cable 22 at the remote device 24 since the controller 32 further knows the current power consumption $P_{pd}$ for the remote device 24 and the current $I_{pd}$ (which equals $I_{cable}$) through the cable 22 (i.e., $V_{pd}=P_{pd}/I_{pd}$). Next, the controller 32 calculates the actual loss $R_{loss}$ (i.e., $R_{loss}=(V_{pse}-V_{pd})/I_{pd}$, see Equation (7)) which includes both cable and connector losses. Finally, the controller 32 determines the actual power demand based on $R_{loss}$ rather than based on a worst case loss as is done in a typical conventional approach. Accordingly, if the controller 32 initially budgeted a first power demand for the remote device 24 and the newly determined power demand is less, the controller 32 is capable of adjusting the remaining power budget 34 by backing down the first power demand to the newly determined power demand. That is, the controller 32 determines that the actual power demand for the remote device 24 is less than originally determined, and adjusts the power budget 34 accordingly. As a result, the power-sourcing apparatus 26 now has a larger power budget 34 left which is potentially available for use by other remote devices 24.

It should be further understood that the power-sourcing apparatus 26 is capable of using iteration to arrive at $V_{pd}$ with improved accuracy. Such iteration takes into account that the power consumed by the remote device 24 varies with its efficiency, and that such efficiency varies with $V_{pd}$. To iterate, the power-sourcing apparatus 26 utilizes additional data on the remote device 24, namely, power vs. $V_{pd}$ (e.g., see the additional power data 54 stored in the memory 44 in FIG. 4).

As mentioned above, embodiments of the invention are directed to techniques for provisioning power from a power budget 34 of a power-sourcing apparatus 26 which involves comparing a power demand for a remote device 24 and allocating power from the power budget 34 when the comparison indicates that the power budget 34 supports the power demand. Such techniques enable smart in-line power provisioning for phantom power applications as well as enable safeguarding against inadvertently attempting to provide more power than what is available in the power budget 34 and thus avoiding damaging the power-sourcing equipment. Moreover, conventional approaches of over-provisioning and using statistical methods, which are both prohibited by the IEEE 802.3af standard, are now unnecessary.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the communications system 20 was described above in the context of VoIP phones by way of example only. The power-sourcing apparatus 26 is capable of being a switch, a router, a hub, a relay, a midspan, a splitter, monitoring equipment or other similar types of equipment.

What is claimed is:

1. A method for provisioning power from a power budget of an apparatus which is configured to provide phantom power to a set of remote devices, the method comprising:
   identifying a power demand for a remote device, the power demand being a total power value based on a power rating for the remote device and a calculated cable dissipation power value for a cable connecting the apparatus to the remote device;
   generating a comparison between the power demand for the remote device and the power budget of the apparatus; and
   selectively allocating or not allocating power from the power budget to the remote device based on whether or not the power budget supports the power demand for the remote device.

2. The method of claim 1 wherein identifying the power demand for the remote device includes:
   directing a time domain reflectometry circuit to send a signal through a cable leading from the apparatus to the remote device to determine a cable distance between the apparatus and the remote device; and
   calculating the cable dissipation power value based on the cable distance.

3. The method of claim 2 wherein calculating the cable dissipation power value includes:
   determining a total resistance of the cable based on the cable distance;
   determining a maximum current through the cable based on the power rating of the remote device; and
   generating, as the cable dissipation power value, an amount based on the total resistance of the cable and the maximum current through the cable.

4. The method of claim 2 wherein calculating a cable dissipation power value comprises:
   identifying an incremental power dissipation per unit length for the type of the cable from available cable power dissipation ratings; and
   calculating the cable dissipation power value as the product of the cable distance and the incremental power.

5. The method of claim 1 wherein identifying the power demand for the remote device includes:
   measuring a voltage drop from the apparatus to the remote device through a cable leading from the apparatus to the remote device;
   measuring a current through the cable; and
   calculating the cable dissipation power value based on the measured voltage drop and the measured current.

6. The method of claim 5 wherein calculating the cable dissipation power value includes:
   determining a total resistance of the cable based on the measured voltage drop and the measure current;
   determining a maximum current through the cable based on the power rating of the remote device; and
   generating, as the cable dissipation power value, an amount based on the total resistance of the cable and the maximum current through the cable.

7. The method of claim 5 wherein each of (i) measuring the voltage drop and the current through the cable, and (ii) calculating the cable dissipation power value based on the measured voltage drop and the measured current, is repeated while the remote device operates in a startup low power mode and a normal high power mode in order to obtain a worst case power demand for the remote device and an actual power demand for the remote device.

8. The method of claim 5 wherein measuring the voltage drop from the apparatus to the remote device through the cable includes:
   sensing a first voltage applied by the apparatus to the cable leading from the apparatus to the remote device;
   receiving a message from the remote device, the message indicating a second voltage sensed by the remote device from the cable; and subtracting the second voltage from the first voltage to obtain the voltage drop from the apparatus to the remote device through the cable.

9. The method of claim 5 wherein identifying the power demand for the remote device further includes taking into account that the power consumed by the remote device varies with the efficiency of the remote device as represented by variation of a voltage measured at the remote device as a function of power dissipation.

10. The method of claim 1, further comprising:
after power is allocated from the power budget to the remote device, determining an actual power demand for the remote device based on an actual loss between the apparatus and the remote device; and
adjusting the power budget of the apparatus based on the actual power demand.

11. The method of claim 1, further comprising:
subtracting the power demand from the power budget in response to allocating power from the power budget to the remote device.

12. The method of claim 1 wherein the apparatus is Ethernet data communications equipment, wherein the remote device is a remote Voice-over-IP telephone, and wherein the method further comprises:
exchanging Voice-over-IP telephone signals through a cable extending between the Ethernet data communications equipment and the Voice-over-IP telephone, the cable being configured to deliver phantom power from the Ethernet data communications equipment to the remote Voice over-IP telephone in response to allocating power from the power budget to the remote device.

13. An apparatus for provisioning power from a power budget to a set of remote devices configured to obtain phantom power from the apparatus, the apparatus comprising:
a set of ports configured to connect to the set of remote devices through a set of cables;
a power supply configured to provide power within the power budget; and
a controller coupled to the set of ports and to the power supply, the controller being configured to:
identify, through a port of the set of ports, a power demand for a remote device, the power demand being a total power value based on a power rating for the remote device and a calculated cable dissipation power value for a cable connecting the apparatus with the remote device;
generate a comparison between the power demand for the remote device and the power budget of the apparatus; and
selectively allocate or not allocate power from the power budget to the remote device based on whether or not the power budget supports the power demand for the remote device.

14. The apparatus of claim 13 wherein the controller, when identifying the power demand for the remote device, is configured to:
direct a time domain reflectometry circuit to send a signal through a cable leading from the apparatus to the remote device to determine a cable distance between the apparatus and the remote device; and
calculate the cable dissipation power value based on the cable distance.

15. The apparatus of claim 14 wherein the controller, when calculating the cable dissipation power value, is configured to:
determine a total resistance of the cable based on the cable distance;

determine a maximum current through the cable based on the power rating of the remote device; and
generate, as the cable dissipation power value, an amount based on the total resistance of the cable and the maximum current through the cable.

16. The apparatus of claim 14 wherein the controller, when identifying the power demand for the remote device, is configured to:
identify an incremental power dissipation per unit length for the type of the cable from available cable power dissipation ratings; and
calculate the cable dissipation power value as the product of the cable distance and the incremental power.

17. The apparatus of claim 13 wherein the controller, when identifying the power demand for the remote device, is configured to:
measure a voltage drop from the apparatus to the remote device through a cable leading from the apparatus to the remote device;
measure a current through the cable; and
calculate the cable dissipation power value based on the measured voltage drop and the measured current.

18. The apparatus of claim 17 wherein the controller, when calculating the cable dissipation power value, is configured to:
determine a total resistance of the cable based on the measured voltage drop and the measure current;
determine a maximum current through the cable based on the power rating of the remote device; and
generate, as the cable dissipation power value, an amount based on the total resistance of the cable and the maximum current through the cable.

19. The apparatus of claim 17 wherein the controller is further configured such that each of (i) measuring the voltage drop and the current through the cable, and (ii) calculating the cable dissipation power value based on the measured voltage drop and the measured current, is repeated while the remote device operates in a startup low power mode and a normal high power mode in order to obtain a worst case power demand for the remote device and an actual power demand for the remote device.

20. The apparatus of claim 17 wherein the controller, when measuring the voltage drop from the apparatus to the remote device through the cable, is configured to:
sense a first voltage applied by the apparatus to the cable leading from the apparatus to the remote device;
receive a message from the remote device, the message indicating a second voltage sensed by the remote device from the cable; and
subtract the second voltage from the first voltage to obtain the voltage drop from the apparatus to the remote device through the cable.

21. The apparatus of claim 17 wherein the controller, when identifying the power demand for the remote device, is configured to take into account that the power consumed by the remote device varies with the efficiency of the remote device as represented by variation of a voltage measured at the remote device as a function of power dissipation.

22. The apparatus of claim 13, wherein the controller is further configured to:
after power is allocated from the power budget to the remote device, determine an actual power demand for the remote device based on an actual loss between the apparatus and the remote device; and
adjust the power budget of the apparatus based on the actual power demand.

23. The apparatus of claim 13 wherein the controller is further configured to:
   subtract the power demand from the power budget in response to allocating power from the power budget to the remote device.

24. The apparatus of claim 13 wherein the apparatus is Ethernet data communications equipment, wherein the remote device is a remote Voice-over-IP telephone, and wherein the controller is further configured to:
   exchange Voice-over-IP telephone signals through a cable extending between the Ethernet data communications equipment and the Voice-over-IP telephone, the cable being configured to deliver phantom power from the Ethernet data communications equipment to the remote Voice over-IP telephone in response to allocating power from the power budget to the remote device.

* * * * *